(12) United States Patent
Lin et al.

(10) Patent No.: US 11,914,837 B2
(45) Date of Patent: Feb. 27, 2024

(54) VIDEO ACQUISITION METHOD, ELECTRONIC DEVICE, AND STORAGE MEDIUM

(71) Applicant: SHANGHAI LILITH TECHNOLOGY CORPORATION, Shanghai (CN)

(72) Inventors: Weishun Lin, Shanghai (CN); Jack Perry, Shanghai (CN); Yihong Liang, Shanghai (CN)

(73) Assignee: SHANGHAI LILITH TECHNOLOGY CORPORATION, Shanghai (CN)

( * ) Notice: Subject to any disclaimer, the term of this patent is extended or adjusted under 35 U.S.C. 154(b) by 0 days.

(21) Appl. No.: 18/252,526

(22) PCT Filed: Jul. 8, 2022

(86) PCT No.: PCT/CN2022/104581
§ 371 (c)(1),
(2) Date: May 10, 2023

(65) Prior Publication Data
US 2024/0012530 A1   Jan. 11, 2024

(51) Int. Cl.
*G06F 3/04815* (2022.01)
*G06T 17/00* (2006.01)
(Continued)

(52) U.S. Cl.
CPC .......... *G06F 3/04815* (2013.01); *G06T 17/00* (2013.01); *H04N 21/47217* (2013.01); *H04N 21/816* (2013.01)

(58) Field of Classification Search
None
See application file for complete search history.

(56) References Cited

U.S. PATENT DOCUMENTS

2005/0187015 A1   8/2005   Suzuki et al.
2008/0268961 A1*  10/2008  Brook .................. A63F 13/497
                                                            463/42
(Continued)

FOREIGN PATENT DOCUMENTS

CN   112642150 A    4/2021
CN   113709543 A   11/2021
(Continued)

OTHER PUBLICATIONS

International Search Report and Written Opinion dated Mar. 20, 2023, issued in corresponding International Application No. PCT/CN2022/104581, filed Jul. 8, 2022, 17 pages.
(Continued)

*Primary Examiner* — Frank S Chen
(74) *Attorney, Agent, or Firm* — Christensen O'Connor Johnson Kindness PLLC

(57) ABSTRACT

A video acquisition method, an electronic device, and a storage medium are disclosed. The video acquisition method is applicable to a virtual scene including at least one virtual object and at least one virtual camera. The terminal determines a target virtual object from the at least one virtual object in response to a camera capturing instruction triggered by a user on a virtual scene interface, controls the at least one virtual camera to capture the target virtual object to acquire capturing data of the target virtual object, and acquires the video of the target virtual object based on the capturing data.

17 Claims, 6 Drawing Sheets

---

Determining the target virtual object corresponding to each virtual camera from the virtual object(s), in response to the camera capturing instruction — S301

Controlling each virtual camera to capture a plot progress of the corresponding target virtual object in the virtual scene, based on the target virtual object corresponding to each virtual camera, to obtain the capturing data of each corresponding target virtual object — S302

(51) Int. Cl.
*H04N 21/472*     (2011.01)
*H04N 21/81*      (2011.01)

(56) References Cited

U.S. PATENT DOCUMENTS

| | | | | |
|---|---|---|---|---|
| 2012/0173991 | A1* | 7/2012 | Roberts | G06F 3/04815 |
| | | | | 715/747 |
| 2020/0368619 | A1* | 11/2020 | Yeung | G06F 3/011 |
| 2022/0203234 | A1* | 6/2022 | Olabode | A63F 13/537 |
| 2023/0186556 | A1* | 6/2023 | Bates | G06V 20/64 |
| | | | | 345/419 |

FOREIGN PATENT DOCUMENTS

| | | | |
|---|---|---|---|
| CN | 113824882 | A | 12/2021 |
| CN | 114225402 | A | 3/2022 |
| CN | 114344896 | A | 4/2022 |

OTHER PUBLICATIONS

Office Action dated Mar. 22, 2023, in corresponding Chinese application No. 202280002614.6, filed Jul. 8, 2022, (Office Action from sibling Chinese application No. translation available), 6 pages.

* cited by examiner

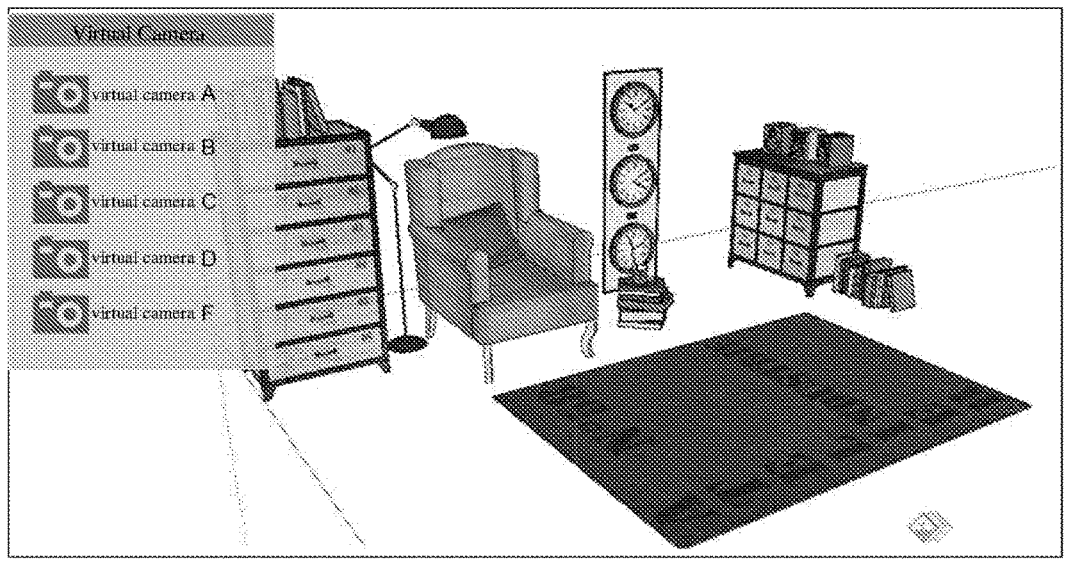

FIG. 5

| Hiding all virtual objects in the virtual scene interface and switching the virtual scene interface to a video playing interface in response to the playing instruction for the video | S501 |

| Playing the video in the video playing interface | S502 |

FIG. 6

| Acquiring a current plot of the virtual scene interface | S601 |

| Playing the video on the virtual scene interface in response to the current plot being a key plot node | S602 |

FIG. 7

| Displaying a configuration interface in the virtual scene interface in response to a second triggering operation on the configuration control in the virtual scene interface | S701 |

| Acquiring capturing parameters of at least one of the virtual cameras and an identifier of the target virtual object, based on the configuration interface | S702 |

| Generating the camera capturing instruction according to the capturing parameters of the at least one of the virtual cameras and the identifier of the target virtual object | S703 |

FIG. 8

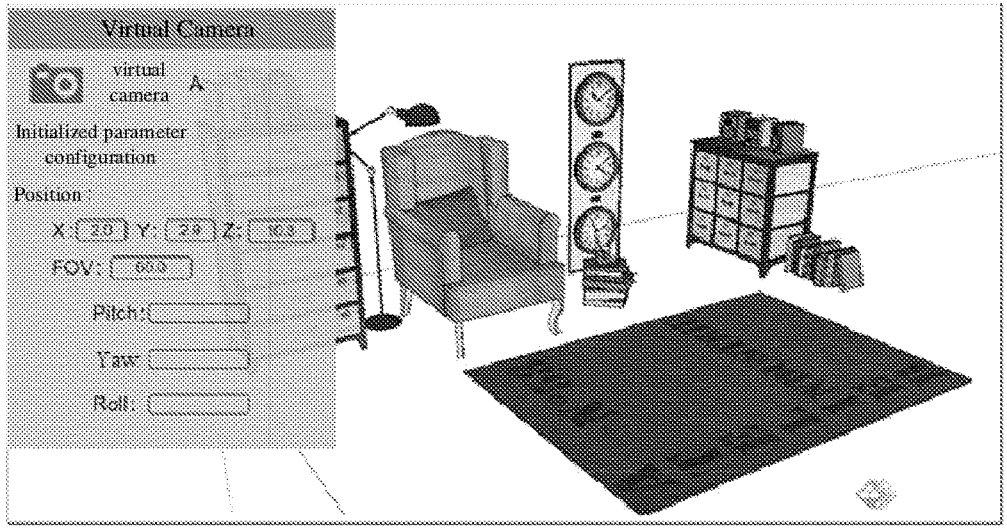

FIG. 9

| Displaying configuration options of each virtual camera corresponding to a respective camera control in the configuration interface in response to a third triggering operation on the at least one of the camera controls | S801 |
|---|---|
| Acquiring the capturing parameters of each virtual camera corresponding to a respective camera control based on the configuration option of the respective virtual camera corresponding to the respective camera control | S802 |

FIG. 10

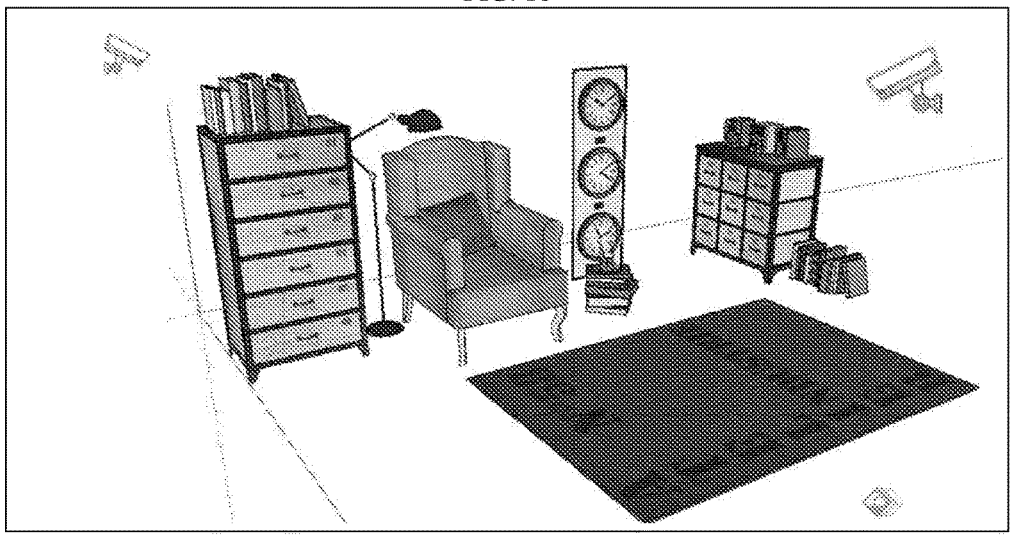

FIG. 11

VIDEO ACQUISITION METHOD, ELECTRONIC DEVICE, AND STORAGE MEDIUM

CROSS-REFERENCE TO RELATED APPLICATION

This application is a national stage application of PCT international application PCT/CN2022/104581, filed on Jul. 8, 2022, entitled "VIDEO ACQUISITION METHOD, ELECTRONIC DEVICE, STORAGE MEDIUM, AND PROGRAM PRODUCT", the entire content of which is incorporated herein by reference.

TECHNICAL FIELD

This disclosure relates to the field of human-computer interaction technologies, and in particular to a video acquisition method, an electronic device, and a storage medium.

BACKGROUND

With the development of computer technologies and smart terminals, many games based on smart terminals are more and more popular with users.

In many games, in order to improve the fun of the game, a game video can be produced based on a game scene or a game plot. A user can play the game video during the game or after the game ends. In addition, in the process of game production including plots, it is also required to produce a large number of videos for game scenes and game characters. For example, the current video production methods commonly used in the game industry use TimeLine as a core implementation method. For example, the TimeLine tool of the Unity engine, a Sequencer tool of the Unreal engine, etc. are used to produce game videos. When the user needs to play a video of a certain object alone, the above tools can be used to obtain a game video of the certain object by editing a complete game video.

SUMMARY

According to a first aspect, some embodiments of the present disclosure provide a video acquisition method, which is applicable at a virtual scene including at least one virtual object and at least one virtual camera. The method includes: determining a target virtual object corresponding to each of the at least one virtual camera from the at least one virtual object in response to a camera capturing instruction triggered by a user on a virtual scene interface; controlling each of the at least one virtual camera to capture a plot progress of the target virtual object in the virtual scene, based on the target virtual object corresponding to each of the at least one virtual camera, to obtain the capturing data of the respective target virtual object; and acquiring a video of the target virtual object based on the capturing data.

In an optional embodiment of the present disclosure, the at least one virtual scene includes a plurality of virtual cameras, when the plurality of virtual cameras correspond to a same target virtual object and capturing parameters of the plurality of virtual cameras are different, controlling each of the plurality of virtual cameras to capture the plot progress of the respective target virtual object in the virtual scene, based on the target virtual object corresponding to each of the plurality of virtual cameras, to obtain the capturing data of the respective target virtual objects includes: controlling each of the plurality of virtual cameras to capture the plot progress of the target virtual object in the virtual scene based on a respective capturing parameter, to obtain the capturing data of the target virtual object.

In an optional embodiment of the present disclosure, the video acquisition method further includes: displaying the at least one virtual camera in the virtual scene interface; and adjusting a capturing parameter of a respective virtual camera in the virtual scene interface in response to a first triggering operation on the respective virtual camera.

In an optional embodiment of the present disclosure, the video acquisition method further includes: displaying a capturing progress of a respective virtual camera in the virtual scene interface during a capturing process of the respective virtual camera. In an optional embodiment of the present disclosure, the video acquisition method further includes: playing the video in the virtual scene interface in response to a playing instruction for the video.

In an optional embodiment of the present disclosure, the playing the video in the virtual scene interface in response to the playing instruction for the video includes: hiding all the at least one virtual object in the virtual scene interface and switching the virtual scene interface to a video playing interface in response to the playing instruction for the video; and playing the video in the video playing interface.

In an optional embodiment of the present disclosure, the video acquisition method further includes: acquiring a current plot of the virtual scene interface; and playing the video in the virtual scene interface in response to the current plot being a key plot node.

In an optional embodiment of the present disclosure, the camera capturing instruction triggered by the user on the virtual scene interface is configured in a manner including: displaying a configuration interface in the virtual scene interface in response to a second triggering operation on a configuration control in the virtual scene interface; acquiring a capturing parameter of the at least one virtual camera and an identifier of the target virtual object, based on the configuration interface; and generating the camera capturing instruction according to the capturing parameter of the at least one virtual camera and the identifier of the target virtual object.

In an optional embodiment of the present disclosure, the virtual scene interface includes a plurality of camera controls. The configuration interface is configured to be displayed in the virtual scene interface in response to a respective camera control being triggered; the acquiring the capturing parameter of the at least one virtual camera based on the configuration interface includes: displaying a configuration option of a respective virtual camera corresponding to the respective camera control in the configuration interface in response to a third triggering operation on the respective camera control; and acquiring the capturing parameter of the respective virtual camera corresponding to the respective camera control based on the configuration option of the respective virtual camera corresponding to the respective camera control.

In an optional embodiment of the present disclosure, the virtual scene interface includes a plurality of camera controls; and the configuration interface is configured to be displayed in the virtual scene interface in response to a respective camera control being triggered; the acquiring the capturing parameter of the at least one virtual camera based on the configuration interface includes: acquiring the capturing parameter of each camera control according to a relationship between the plurality of camera controls and the capturing parameters in response to a fourth triggering operations on the respective camera control.

In an optional embodiment of the present disclosure, the configuration interface includes a plurality of object controls. The acquiring the identifier of the target virtual object based on the configuration interface includes: acquiring the identifier of the target virtual object corresponding to a respective object control in response to a fifth triggering operation on the respective object control.

In an optional embodiment of the present disclosure, the acquiring the video of the target virtual object based on the capturing data includes: displaying a data selection control corresponding to a respective virtual camera in the virtual scene interface; acquiring capturing data of the respective virtual camera corresponding to a respective data selection control in response to a triggering operation on the respective data selection control; and acquiring the video of the target virtual object according to the capturing data of the respective virtual camera corresponding to the respective data selection control.

In an optional embodiment of the present disclosure, the acquiring the video of the target virtual object according to the capturing data of the respective virtual camera corresponding to the respective data selection control includes: determining execution timing and executing duration of the respective virtual camera according to the capturing parameter of the respective virtual camera corresponding to the respective data selection control; and performing data processing on the capturing data of the respective virtual camera according to the execution timing and the execution duration of the respective virtual camera, to obtain the video of the target virtual object.

In an optional embodiment of the present disclosure, the virtual scene is configured to be displayed by a terminal when an application program runs on the terminal; the capturing data includes screenshots of multiple frames taken on the virtual scene interface, or screenshots of multiple frames for a specific capturing area in the virtual scene; the capturing data are acquired based on picture pixel data from a display function interface of the terminal according to a certain period.

In an optional embodiment of the present disclosure, the acquiring the video of the target virtual object based on the capturing data includes: in the case of acquiring capturing data from one virtual camera, performing time correction, sound and picture synchronization processing on the capturing data, to obtain the video with synchronized sound and picture of the target virtual object.

In an optional embodiment of the present disclosure, the acquiring the video of the target virtual object based on the capturing data includes: in the case of acquiring capturing data from a plurality of virtual cameras, performing stitching processing and editing processing on a plurality of capturing data from the plurality of virtual cameras, to obtain the video of the target virtual object.

In an optional embodiment of the present disclosure, the controlling the at least one virtual camera to capture the target virtual object, to acquire the capturing data of the target virtual object includes: controlling a respective virtual camera to track the target virtual object based on the target virtual object corresponding to the respective virtual camera by using a target object recognition and tracking method, to perform a capturing operation on the target virtual object.

According to a second aspect, some embodiments of the present disclosure provide an electronic device, which includes: one or more memories, and one or more processors, wherein one or more computer programs are stored in the one or more memories, and when the one or more computer programs are executed by the one or more processors, the electronic device is configured to execute the video acquisition method according to any one of the embodiments in the first aspect.

According to a third aspect, some embodiments of the present disclosure provide a non-transitory computer-readable storage medium storing a computer program, the computer program is executed by a processor, to execute the video acquisition method according to any one of the embodiments in the first aspect.

According to a fourth aspect, some embodiments of the present disclosure provide a computer program product including computer-executable instructions, the computer-executable instructions are executed by a processor, to execute the video acquisition method according to any one of the embodiments in the first aspect.

BRIEF DESCRIPTION OF THE DRAWINGS

In order to illustrate the technical solutions in the embodiments of the present disclosure or existing technologies more clearly, the accompanying drawings used in the description of the embodiments or existing technologies will be briefly introduced below. Apparently, the accompanying drawings in the following description are only some embodiments of the present disclosure. For those of ordinary skill in the art, other drawings can also be derived from these drawings without creative effort.

FIG. 5 is a schematic diagram showing a virtual camera interface in a virtual scene interface according to an embodiment.

FIG. 6 is a schematic flowchart of a video acquisition method according to another embodiment.

FIG. 7 is a schematic flowchart of a video acquisition method according to another embodiment.

FIG. 8 is a schematic flowchart of a video acquisition method according to another embodiment.

FIG. 9 is a schematic diagram showing a configuration interface in a virtual scene interface according to an embodiment.

FIG. 10 is a schematic flowchart of a video acquisition method according to another embodiment.

FIG. 11 is a schematic diagram showing camera controls in a virtual scene interface according to another embodiment.

DETAILED DESCRIPTION OF THE EMBODIMENTS

In order to make the objects, technical solutions and advantages of the present disclosure clearer, the present disclosure will be further described in detail below with reference to the accompanying drawings and embodiments. It should be understood that the specific embodiments described herein are only used to explain the present disclosure, but not to limit the present disclosure.

It will be understood that terms "first", "second", etc. used in this disclosure may be used herein to describe various elements, but these elements are not limited by these terms. These terms are only used to distinguish a first element from another element. For example, a first client may be referred to as a second client, and similarly, a second client may be referred to as a first client, without departing from the scope of this disclosure. Both the first client and the second client are clients, but they are not the same client. The 3D animation production commonly used in the currently game industry is based on TimeLine as the core implementation method, such as a TimeLine tool of the Unity engine and a Sequencer tool of the Unreal engine. In an example, firstly, developers need to create tracks bound with different property objects respectively on a track window, and can also arrange levels of tracks by dragging operations. Then, the developers can create animations, events, etc., in a timeline view by clicking and dragging operations, to edit and realize various animation clips, so as to realize the stitching and synthesis of the animation clips, and finally generate a complete animation.

However, as the content of the animation clips increases, the content in the window for editing the animation clips will become massive, resulting in that the visual experience will be poor and the experience will be not intuitive. Moreover, such a user interface (UI) interaction via the track window and the timeline window may be only suitable for operations on a computer, not for mobile devices.

In view of the above technical problems, the present disclosure provides a video acquisition method. Firstly, application scenes of the video acquisition method will be introduced below.

Figure 1:
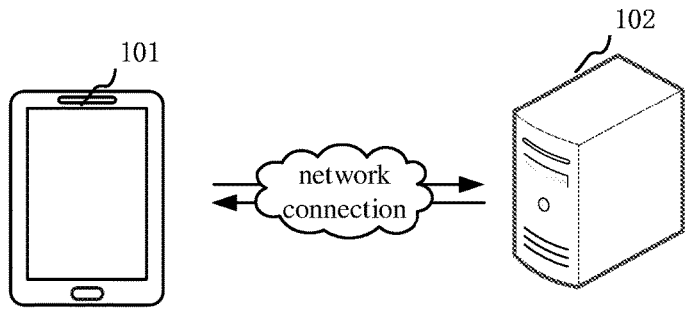
FIG. 1 is an application environment diagram of a video acquisition method according to an embodiment.

FIG. 1 is a schematic diagram of an implementation scene of the video acquisition method according to an embodiment of the present disclosure. As shown in FIG. 1, the implementation scene may include a terminal 101 and a server 102. The terminal 101 and the server 102 are communication connected through a wired or wireless manner. The wireless manner may be Bluetooth, Wi-Fi, 3G, 4G, 5G, etc., which is not limited to this embodiment.

An application program supporting the above-mentioned virtual scene is installed and run on the terminal 101. The application program can be any one of a massively multiplayer online role playing game (MMORPG), an online deductive entertainment project, a virtual reality application program, and a three-dimensional map program. The user can control a virtual character in the virtual scene to perform operations such as crawling, walking, running, riding, jumping, driving, picking up, throwing, and flipping items, through the terminal 101. The virtual character is a virtual human character controlled by the user and displayed in the above virtual scene.

The server 102 may include one server, or may be a server cluster composed of multiple servers, or may be a cloud server. The server 102 is configured to provide backstage service for the application program supporting the virtual scene. For example, the server 102 may undertake computational work, provide data required for the virtual scene, and the like.

Based on the above application environment, the terminal can perform operations such as editing, generating, and displaying a video of a virtual object in the virtual scene, in response to a video acquisition instruction triggered by the user, based on the virtual scene.

The virtual scene is a virtual scene displayed when the application program runs on the terminal. The virtual scene can be a scene obtained by simulating a real scene using technologies such as the augmented reality (AR) and virtual reality (VR), or may be a completely fictitious scene, or may be a half-fictious and half-simulated virtual scene. The virtual scene can be a two-dimensional scene or a three-dimensional scene. Multiple elements may be set in the virtual scene according to the requirements of the game. For example, the virtual scene may include elements such as buildings, pieces of furniture, vehicles, and items related to the plot.

The virtual object may be a virtual character or a virtual item in the virtual scene, for example, a human character, an animal character, a vehicle, a house, a building, a piece of furniture, an item related to the plot, and the like. Multiple virtual objects may be included in the virtual scene, and each virtual object has its own attributes such as shape, color, and volume in the virtual scene. The virtual object may be created according to the characters in the plot, and there may be one or more virtual objects in a virtual scene.

Figure 2:
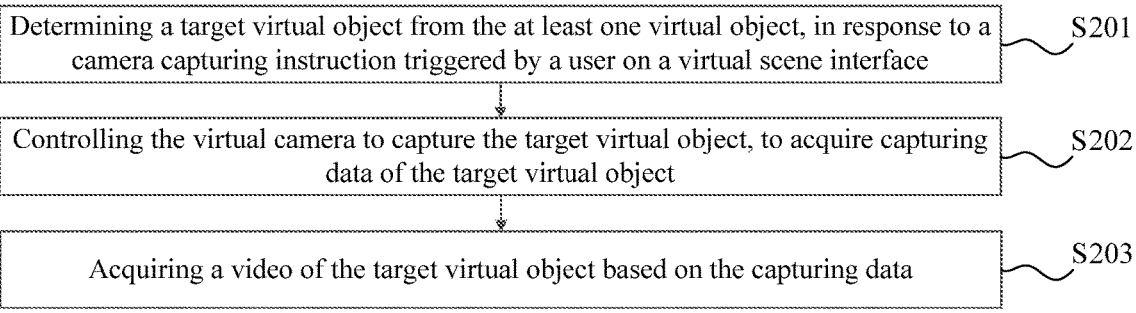
FIG. 2 is a schematic flowchart of a video acquisition method according to an embodiment.

FIG. 2 is a flowchart of a video acquisition method according to an embodiment of the present disclosure. The acquisition of the video is applied at the terminal 101 shown in FIG. 1. As shown in FIG. 2, the video acquisition method is applicable to a virtual scene. The virtual scene includes a virtual object(s) and a virtual camera(s). The video acquisition method includes steps S201 to S203.

At step 201, in response to a camera capturing instruction triggered by a user on a virtual scene interface, a target virtual object from the virtual object(s) is determined. In an example, the virtual scene interface may be an interactive interface corresponding to a virtual scene in an application program, or may be an interactive interface in a virtual scene of augmented reality or virtual reality. The virtual scene interface includes a target object and various controls for adjusting the target object. The target object is a virtual object, which may include a virtual character and a virtual item. Exemplarily, when the application program is a game application, the virtual character may be a player's avatar, an AI avatar, or a non-player character (NPC) of the game application. The virtual item can be determined based on the virtual scene. For example, when the virtual scene is a scene in a room, then the virtual item can include virtual furniture, a virtual item, a virtual camera, etc. in the room; when the virtual scene is a street scene, the virtual item can include street environment elements such as a road, a tree, a flower, a house, a street light, a vehicle, a virtual camera, etc.

In this embodiment, the virtual camera(s) can be placed at any one or more positions in the virtual scene. The virtual scene interface includes a capturing control for triggering and calling the virtual camera(s) to capture. The capturing control can be suspended and displayed in the virtual scene interface, or can be hidden on any side of the virtual scene interface. In response to detecting a sliding operation on the side of the virtual scene interface, the capturing control is triggered to slide out from the side of the virtual scene interface and be displayed.

In an example, the capturing control includes the identifier of each virtual camera in the virtual scene and the identifier of each virtual object that can be captured in the virtual scene. The user may determine the identifier of the virtual camera to perform capturing and the identifier of the virtual object to be captured based on the virtual scene interface, where the virtual object to be captured is the target virtual object. Exemplarily, the user may determine the identifier of the virtual camera to perform capturing and the identifier of the target virtual object in the capturing control through operations such as clicking, double-clicking, ticking, sliding, etc. When the terminal detects that the capturing control is triggered, in response to the camera capturing instruction triggered by the user on the virtual scene interface, the target virtual object is determined from the at least one virtual object based on the identifier of the target virtual object. In an example, the virtual camera to perform capturing is determined based on the identifier of the virtual camera.

At step 202, the virtual camera is controlled to capture the target virtual object, to acquire capturing data of the target virtual object.

In an example, the terminal may capture the target virtual object based on the virtual camera selected by the user on the virtual scene interface. Alternatively, the terminal may also capture the target virtual object based on a state of each virtual camera in the virtual scene. Exemplarily, the virtual camera in a dormant state or in an idle state in the virtual scene is acquired to capture the target virtual object.

In this embodiment, in the case of controlling one virtual camera to capture the target virtual object, the terminal can directly acquire the capturing data generated by the virtual camera, and determine the capturing data as the capturing data of the target virtual object. In the case of controlling multiple virtual cameras to capture the target virtual object, the terminal needs to acquire the capturing data generated by each of the multiple virtual cameras, to obtain multiple capturing data for the target virtual object. The capturing data may be screenshots of multiple frames taken on a display interface of the virtual scene, or may be screenshots of multiple frames for a specific capturing area in the virtual scene. Since the contents in the virtual scene are pixel pictures obtained by rendering the contents to be displayed, it may be only required to acquire picture pixel data from a display function interface provided by the terminal according to a certain period. The picture pixel data is the capturing data. The acquisition of the capturing data is based on a similar principle for film capturing, in which multiple picture data are stored in the form of frames.

In an example, the capturing data may include action data of the target virtual object in the virtual scene. For example, a behavior of the target virtual object in the virtual scene within a certain time period, e.g., may include the user's controlling of the virtual character to walk, jump, sit down, stand, operate a virtual item in the virtual scene, trigger other operations in the virtual scene, etc. Operating the virtual item in the virtual scene may include controlling the virtual character to flip through an item A, open an item B, rotate an item C, push and pull an item D, or the like.

At step 203, a video of the target virtual object is acquired based on the capturing data.

In this embodiment, after acquiring the capturing data, the terminal needs to perform data processing on the capturing data, to obtain the video of the target virtual object. Exemplarily, in the case of acquiring capturing data of a virtual camera, the terminal needs to perform time correction, sound and picture synchronization processing, etc. on the capturing data, to obtain a video with synchronized sound and picture of the target virtual object. In the case of acquiring capturing data of multiple virtual cameras, the terminal further needs to perform fusion processing such as stitching, editing, etc., on the multiple capturing data, to obtain the video of the target virtual object.

In an example, when the terminal performs processing, such as stitching and editing of multiple capturing videos, the terminal needs to obtain processing parameters of each of the multiple capturing data, for example, a starting frame, an ending frame and a stitching sequence of capturing data A; a starting frame, an ending frame and a stitching sequence of capturing data B; a starting frame, an ending frame and a stitching sequence of capturing data C. The terminal performs data processing on each of the multiple capturing data based on the starting frame, the ending frame, the stitching sequence of each of the multiple capturing data, to obtain the video of the target virtual object. In an example, the processing parameters may be input by the user through the virtual scene interface, or may be determined by the user based on a processing parameter control in the virtual scene interface. In addition, the processing parameters may also be carried in the capturing data, that is, when determining the virtual camera used for capturing, the terminal may also determine relevant capturing parameters of the virtual camera, for example, a starting time for capturing, an ending time for capturing, etc., which are not limited to this embodiment.

In this embodiment, after obtaining the video of the target virtual object based on the capturing data of the virtual camera, the terminal can export the video into a lua file. When the video needs to be loaded subsequently, the lua file can be directly read. Exemplarily, in the scene where the application program is a game application, the video of the target virtual object can be played in the specified virtual scene of the game. When the video needs to be played, the terminal can directly read the lua file of the video to realize the play of the video, that is, to realize the play and production of the animation corresponding to the target virtual object. Lua language is a widely used programming scripting language, especially in the field of mobile program development. A file that supports the lua language is a lua file, and the lua file supports read and write operations in the lua language environment.

The above video acquisition method is applied at the virtual scene, and the virtual scene includes the virtual object(s) and the virtual camera(s). In response to the camera capturing instruction triggered by the user on the virtual scene interface, the terminal determines the target virtual object from the virtual object(s), controls the virtual camera(s) to capture the target virtual object, acquires the capturing data of the target virtual object, and acquires the video of the target virtual object based on the capturing data. In such scheme, the terminal can generate the video of the virtual object required by the user through acquiring the capturing data of the virtual object by the virtual camera(s) in the virtual scene, in response to the camera capturing instruction triggered by the user, which replaces the technical solution for producing the animation or the video of the virtual object in frames by the user based on timeline in the existing technology, which does not require the user to have programming expertise and experience, thereby reducing the complexity of producing the animation or the videos of the virtual object(s), and also improving the production efficiency of the animation or the videos of the virtual object(s).

Figure 3:
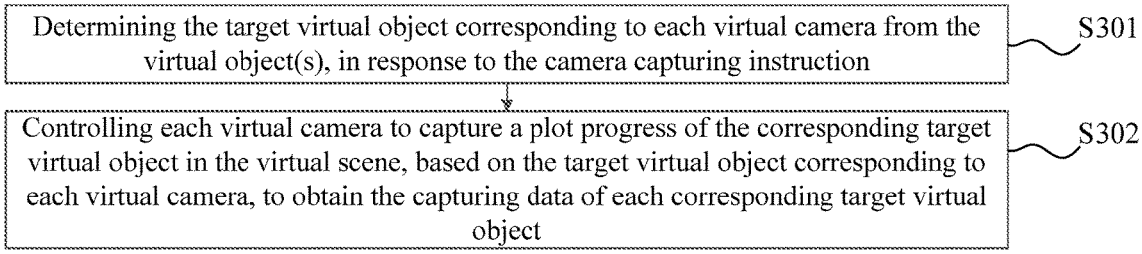
FIG. 3 is a schematic flowchart of a video acquisition method according to another embodiment.

The virtual camera in the virtual scene can capture a corresponding target virtual object, and can also capture multiple target virtual objects. In an optional embodiment of the present disclosure, as shown in FIG. 3, in the above step 201, the determining the target virtual object from the virtual object(s) in response to the camera capturing instruction triggered by the user on the virtual scene interface, includes steps S301 to S302.

At step 301, in response to the camera capturing instruction, the target virtual object corresponding to each virtual camera is determined from the virtual object(s).

In an example, the camera capturing instruction may include information of at least one of the identifier of the virtual camera to perform capturing, the identifier of the target virtual object to be captured, and a corresponding relationship between the virtual camera and the target virtual object to be captured. Exemplarily, the virtual scene includes a virtual camera A, a virtual camera B, a virtual camera C, and a virtual camera D, etc. The virtual scene includes a virtual object 1, a virtual object 2, a virtual object 3, etc. The camera capturing instruction carries the virtual camera A and a target virtual object 1 corresponding to the virtual camera A, the virtual camera B and a target virtual object 1 corresponding to the virtual camera B, the virtual camera C and a target virtual object 2 corresponding to the virtual camera C, and so on.

In this embodiment, in response to the camera capturing instruction, the terminal determines the virtual camera to perform capturing and the target virtual object corresponding to the virtual camera based on the content carried by the camera capturing instruction. In an example, in the case that the content carried by the camera capturing instruction includes the identifier of the virtual camera to perform capturing, the terminal may determine the virtual scene where this virtual camera is located based on the identifier of the virtual camera, determine a virtual object in a capturing area of the virtual camera from the virtual scene where the virtual camera is located, and determine the virtual object as the target virtual object to be captured by the virtual camera. In an example, in the case that there are multiple virtual objects in the capturing area of the virtual camera in the virtual scene, multiple virtual objects can also be determined as target virtual objects to be captured by the virtual camera.

In an example, in the case where the content carried by the camera capturing instruction includes the identifier of the virtual camera to perform capturing and the identifier of the target virtual object, the terminal may determine each of the virtual cameras and the virtual scene where each of the target virtual objects is located, based on the identifiers of the virtual cameras and the identifiers of the target virtual objects; create the corresponding relationship between the target virtual objects and the virtual cameras in the same virtual scene based on the above virtual scene; and determine the target virtual object corresponding to each of the virtual cameras based on the same virtual scene and the corresponding relationship.

In an example, in the case where the content carried by the camera capturing instruction includes the identifier of the virtual camera to perform capturing, the identifier of the target virtual object, and the corresponding relationship between the virtual camera and the target virtual object to be captured, the terminal can directly determine the target virtual object corresponding to each of the virtual cameras based on the corresponding relationship, which is not limited to this embodiment.

At step 302, based on the target virtual object corresponding to each virtual cameras, each virtual camera is controlled to capture a plot progress of the corresponding target virtual object in the virtual scene, to obtain capturing data of each corresponding target virtual object.

In this embodiment, after determining the target virtual object corresponding to each of the virtual cameras, the terminal may control each of the virtual cameras to enter a capturing state. Exemplarily, when the current state of the virtual camera is in an off state or in a dormant state, the terminal can control each virtual camera to switch from the off state or the dormant state to a normal working state, that is, the capturing state. In an example, when the current state of the virtual camera is in the normal working state, the virtual camera may capture the virtual scene aimlessly, or may capture other virtual objects. In this case, the terminal may, based on the target virtual object corresponding to the virtual camera, control the virtual camera to track the target virtual object, and perform capturing operation on the target virtual object. The virtual camera tracking the target virtual object can be realized by algorithms such as target recognition and target tracking.

After the terminal controls each virtual camera to enter the normal working state for the corresponding target virtual object, each virtual camera can acquire the plot progress of the corresponding target virtual object in the virtual scene. Here, the plot progress may include the behavior of the target virtual object in the virtual scene, such as, the operation of the captured avatar (that is, the target virtual object) on the virtual item in the virtual scene, the communication between the captured avatar and other avatars, and actions of the captured avatar such as walking, jumping, hiding, blowing kisses, clapping, dancing, eating, taking medicine, being clicked, lying still, standing still, pushing doors, talking, etc. The virtual camera generates the capturing data of the target virtual object in the virtual scene based on the collection and capturing of the behavior of the target virtual object in the virtual scene.

In this embodiment, the terminal may determine the target virtual object to be captured by each virtual camera, and control each virtual camera to capture operations related to the plot progress of the target virtual object based on the respective target virtual object corresponding to each virtual camera, thereby obtaining the capturing data of the target virtual object. The capturing data can provide the terminal with data support for producing the video corresponding to the target virtual object. When the terminal needs a scene related to the plot video of the target virtual object, the terminal does not need to acquire the plot video of the target virtual object through other animation production methods, which reduces the complexity of video acquisition and production.

In the process of capturing the target virtual object, each virtual camera in the virtual scene can dynamically adjust its capturing parameter(s). In an optional embodiment of the present disclosure, when the multiple virtual cameras correspond to the same target virtual object, and the capturing parameters of the multiple virtual cameras are different, in the above step 302, based on the target virtual object corresponding to each of the virtual cameras, controlling each of the virtual cameras to capture the plot progress of the corresponding target virtual object in the virtual scene, to obtain the capturing data of each of the target virtual objects includes the following step.

The multiple virtual cameras are controlled to separately capture the plot progress of the target virtual object in the virtual scene based on their respective capturing parameter(s), to obtain the capturing data of the target virtual object.

In this embodiment, different virtual cameras can be placed in different positions in the virtual scene, or different virtual cameras can also be placed in different virtual scenes. For virtual cameras at different positions in the virtual scene, when capturing the same target virtual object, the capturing parameters of the virtual cameras are different. In an example, the capturing parameters include a position, rotation parameters, a field of view (FOV), a capturing focal length, a change duration, a change curve, a capturing filter, a depth of field effect, etc. of the virtual camera. The rotation parameters include rotation angles of pitch, yaw and roll separately around an x-axis, a y-axis and a z-axis. The FOV refers to a range that the lens can cover. The capturing filter includes four-corner vignetting, Gaussian blur, color aberration, blood splatter effect, icing effect, underwater effect, radial blur, bloom effect, electronic interference, etc.

Before controlling each virtual camera to capture the target virtual object, or during the process of controlling each virtual camera to capture the target virtual object, the terminal can adjust the capturing parameters of the virtual camera. Exemplarily, in the process of tracking and capturing of the target virtual object, the terminal may adjust the rotation parameters, the FOV, and the capturing focal length of each virtual camera based on a moving position of the target virtual object. When a specific feature of the target virtual object needs to be captured, for example, when the target virtual object operates a virtual item in the virtual scene, the virtual item can be close-up. In this case, the terminal can control the rotation parameters, the FOV and the capturing focal length of one of the virtual cameras, to achieve the close-up of the virtual item, and control the rotation parameters, the FOV and the capturing focal length of other virtual cameras to capture the target virtual object, to achieve continuous capturing of the target virtual object.

The capturing data corresponding to the target virtual object is created based on the virtual cameras' capturing of the behaviors and dialogues of the target virtual object, of the virtual items operated by the target virtual objects, and of other plot processes of the target virtual object.

In this embodiment, when multiple virtual cameras capture the same target virtual object, the terminal can separately control the capturing parameters of each virtual camera, and acquire the behavior of the target virtual object and related virtual items involved by the target virtual object in the virtual scene in time, so that the field of view is more comprehensive, and the generated capturing data is more complete.

Figure 4:
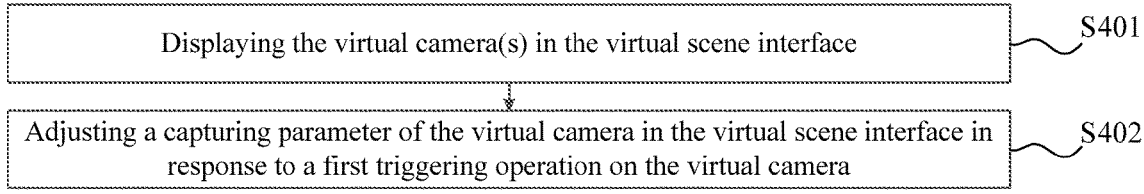
FIG. 4 is a schematic flowchart of a video acquisition method according to another embodiment.

The control of the capturing parameters of the virtual camera by the terminal may be achieved by adaptively adjustment through tracking the target virtual object, or by adjusting the capturing parameters of the virtual camera in response to the user's adjustment instruction based on the virtual scene interface. In an optional embodiment of the present disclosure, as shown in FIG. 4, the method further includes steps S401 to S402.

At step 401, the virtual camera(s) in the virtual scene interface is displayed.

In this embodiment, the terminal may display a configuration control corresponding to at least one virtual camera in the virtual scene in the virtual scene interface. Or, the terminal may display an interface including a configuration control corresponding to at least one virtual camera in the virtual scene, in the virtual scene interface. As shown in FIG. 5, the virtual scene interface is a virtual living room scene, and an interface including configuration controls corresponding to 5 virtual cameras is suspended and displayed on a left edge of the virtual living room scene. The configuration controls refer to virtual camera icons and corresponding words such as "Virtual Camera A" and "Virtual Camera B" on a left side of the interface. Or, the terminal can also display at least one virtual camera at a respective specific position in the virtual scene, as shown in FIG. 11, a camera control corresponding to a virtual camera is displayed in either of an upper left corner and an upper right corner of the interface. In an example, the configuration control corresponding to the at least one virtual camera and the interface including the at least one virtual camera can be suspended and displayed in the virtual scene interface.

In an example, the user can configure and adjust the capturing parameters of the virtual camera based on the configuration control corresponding to the at least one virtual camera or the interface including the at least one virtual camera. In the case where there is no need to configure and adjust the capturing parameters of the virtual camera, the user can hide the configuration control corresponding to the at least one virtual camera or the interface including the at least one virtual camera by sliding, double-clicking blank space, clicking a close button, etc., thereby returning to the virtual scene interface.

In an example, when the terminal displays each of the at least one virtual camera at a corresponding specific position in the virtual scene, the user can configure and adjust the capturing parameters of the virtual camera through operations such as clicking, double-clicking, dragging, etc. When there is no need to configure and adjust the capturing parameters of the virtual camera, the user can restore the position of the virtual camera through operations such as dragging, double-clicking, etc., that is, to restore the virtual camera to a specified position in the virtual scene.

At step 402, in response to a first triggering operation on the virtual camera, the capturing parameters of the virtual camera in the virtual scene interface are adjusted.

In an example, the user can perform the first triggering operation on the virtual camera based on the configuration control corresponding to the virtual camera, the interface including the configuration control corresponding to the virtual camera, or the virtual camera itself (the camera control corresponding to either of the virtual cameras shown in the upper left and upper right corners of FIG. 11). Exemplarily, the first triggering operation may be clicking, double-clicking, dragging, sliding, and so on. The first triggering operation may be that the user determines the virtual camera to be adjusted by double-clicking the configuration control or the camera control. The first triggering operation may also be that the user selects the virtual camera to be adjusted from the interface including at least one virtual camera. The first triggering operation may also be that the user drags the virtual camera to be adjusted to a preset position. An identifier of the virtual camera to be adjusted may be carried in the first triggering operation. In an example, there may be one or more identifiers of the virtual camera to be adjusted, that is, the user may adjust the capturing parameters of a single virtual camera, or may adjust the capturing parameters of multiple virtual cameras in batches.

In this embodiment, the terminal may display capturing parameter options of the virtual camera to be adjusted in the virtual scene interface based on the virtual camera to be adjusted. The terminal may acquire the capturing parameters of the virtual camera to be adjusted, configured by the user based on the capturing parameter options. In an example, the terminal may also display a configuration interface of the virtual camera to be adjusted in the virtual scene interface. The configuration interface may be suspended and displayed in the virtual scene interface; and the terminal may acquire capturing parameters of the virtual camera to be adjusted, configured by the user based on the configuration interface. In an example, when the user needs to configure the same capturing parameters for multiple virtual cameras, the terminal can synchronize the capturing parameters of the virtual camera to other virtual cameras in the virtual scene in response to receiving an operation that the user triggers a configuration synchronization.

In this embodiment, the terminal can configure and adjust the capturing parameters of the virtual camera(s) in response to the user's first triggering operation, so that each virtual camera can capture the plot progress of the target virtual object according to the user's requirements. Thus, the obtained capturing data of each virtual camera is more efficient.

In order to optimize the user's sense of experience, in an optional embodiment of the present disclosure, the method further includes a following step.

A capturing process of the virtual camera(s) is displayed on the virtual scene interface during a capturing process of the virtual camera(s).

In this embodiment, the target virtual object captured by the virtual camera is in motion, and thus the target virtual object may generate multiple behaviors and dialogues in the virtual scene, that is, the plot process. In order to track the movement of the target virtual object more accurately in the virtual scene, the terminal can display the capturing progress of the virtual camera in the virtual scene interface. In an example, the capturing progress includes a real-time picture, capturing parameters, etc., during the capturing.

The terminal may display and suspend the capturing progress of the virtual camera in the virtual scene interface, or display the capturing progress of the virtual camera at a designated position in the virtual scene. In an example, the terminal can display the capturing progress of multiple virtual cameras at the same time, or can display the capturing progress of only one virtual camera at a time, and switch to display the capturing progress of other virtual cameras in response to receiving a switching display operation triggered by the user.

In this embodiment, the terminal can display the capturing process of the virtual camera in the virtual scene interface, and the user can directly view the capturing picture and capturing parameters of the virtual camera, so that the user can adjust the capturing parameters of the virtual camera in time, to achieve better optimized capturing effect.

After the virtual camera completes the capturing, the terminal obtains the video of each virtual camera based on the capturing data. In an optional embodiment of the present disclosure, the method further includes a following step.

A video is played in the virtual scene interface in response to a playing instruction for the video.

In this embodiment, the terminal may display a play control for playing the video in the virtual scene interface. After receiving an operation from the user based on the play control, in response to the playing instruction, e.g., the terminal may display multiple videos that can be played. After receiving one or more videos determined by the user, the terminal may play the one or more videos in the virtual scene interface. Exemplarily, the terminal can play the one or more videos through cutscenes; or play the one or more videos through a play window in the virtual scene interface. In the case of playing multiple videos, the terminal can play the multiple videos through multiple play windows respectively in the virtual scene interface.

In an example, as shown in FIG. 6, playing the video in the virtual scene interface in response to the playing instruction for the video includes steps S501 to S502.

At step 501, in response to the playing instruction for the video, all virtual objects in the virtual scene interface are hidden, and the virtual scene interface is switched to a video playing interface.

Exemplarily, the video playing interface can be implemented through the cutscenes. The cutscene refers to a short segment of a video with a predefined length, and the video is managed by breaking up the whole into parts. For example, a complete plot process can last for 20 minutes. It can be considered to divide the complete plot process into 2-minute cutscenes, and the cutscenes can be read according to instructions during the playing. In addition, the design of cutscenes also reduces the time granularity for users to watch the plot during the game, and improves the user experience.

In an example, the terminal plays the video through the cutscenes. Before playing the video through the cutscenes, the terminal can also hide the virtual objects involved in the virtual scene, and modify environmental factors of the virtual scene to characterize a playing scene when the video is played. Exemplarily, the environmental factors may include sky and time. For example, the virtual scene may be in the daytime, and the modified cutscene for playing the video may be at dead of night.

At step 502, the video is played in the video playing interface.

In this embodiment, in the case of playing the video through cutscenes, the terminal can switch the cutscenes corresponding to different virtual cameras based on the user's switching instruction. Just one cutscene may be displayed in the virtual scene interface at this time to play the video. After detecting that the video playing is completed, the terminal can switch back to the virtual scene interface and restore the virtual objects in the virtual scene.

In an example, in addition to the play control for the video, the cutscene may further include a video editing control. In response to the video editing control in the cutscene being triggered, the terminal may display an editing interface in the cutscene, which is used to edit the virtual objects that may be included in the cutscene, or operation instructions such as adding, deleting, modifying the cutscene, etc. After editing the cutscene, the terminal may hide the editing interface and return to the cutscene.

In this embodiment, the terminal can play the video based on various methods, and the user can directly play the video based on the virtual scene interface, so that the user interaction experience is optimized.

When the application program is a game application, the video can play a role in promoting the plot when the game is running. In an optional embodiment of the present disclosure, as shown in FIG. 7, the method further includes steps S601 to S602.

At step 601, the current plot of the virtual scene interface is acquired.

In this embodiment, during the process of running the game application on the terminal, the terminal can acquire the current plot of the virtual scene interface. Exemplarily, the game application may be a role-playing game, an online deductive entertainment project, etc., for example, an escape room game, a mystery solving game, and the like. The plot may include plot nodes of one or more virtual objects in the virtual scene. It can be determined whether the current plot is a key plot based on the plot nodes. Exemplarily, the key plot can be understood as a plot that promotes the running of the game. Taking a live action role playing (LARP) game as an example, the key plot node can be a plot introduction including key evidence, or a plot introduction including a key character. When initializing the plot, the terminal can set whether each plot node is a key plot node, and mark the key plot node or create a corresponding relationship between the key plot node and the plot. When the game runs to each plot, it can be determined whether the current plot is the key plot node based on the preset corresponding relationship or whether the plot has a key node mark, which is not limited to this embodiment.

At step 602, in response to the current plot being a key plot node, the video is played on the virtual scene interface.

In this embodiment, the key plot node is used to promote the development of the plot and show more effective information to the user. Based on this, the terminal can set a variety of triggering operations at the key plot node. For example, when the terminal detects that the key plot node is reached, the terminal is triggered to play the video corresponding to the current key plot node; or, when the terminal detects that the key plot node is reached, the terminal is triggered to perform the operation of switching to the virtual scene corresponding to the key plot node. The virtual items related to the plot can be placed in the virtual scene corresponding to the key plot node, or, the video can be played in the virtual scene corresponding to the key plot node. In an example, the terminal can preset a relationship between each of the key plot nodes and the corresponding video, so that when the video is triggered to play, the corresponding video can be obtained from video storage space and played. In an example, the video storage space may be local storage space of the terminal, storage space of a server communicated with the terminal, or storage space of a third-party cloud communicated with the terminal, which is not limited to this embodiment.

In an example, the terminal can directly play the video on the virtual scene interface in a suspended display manner, or can create a window on the virtual scene interface to play the video, or can also determine a block component in the virtual scene interface as a region for playing the video. The user can perform operations such as zooming, reducing, closing, and opening, on the video interface in the process of playing the video.

In this embodiment, the terminal sets a corresponding relationship between each of key plot nodes and the video, and triggers the operation of playing the video on the virtual scene interface in response to each of the key plot nodes being reached, which can effectively use the video to promote the plot and optimize the user's gaming experience.

In an optional embodiment of the present disclosure, as shown in FIG. 8, the camera capturing instruction being triggered by the user on the virtual scene interface includes steps S701 to S703.

At step 701, in response to a second triggering operation on the configuration control in the virtual scene interface, the configuration interface in the virtual scene interface is displayed.

In this embodiment, the virtual scene interface may include a configuration control for configuring the virtual camera, such as the virtual camera icon and the word "virtual camera A" as shown in FIG. 5. When the configuration control is clicked, double-clicked, slid or the like by the user to perform the second triggering operation, the terminal displays the configuration interface in the virtual scene interface in response to the second triggering operation. As shown in FIG. 9, the configuration interface is displayed on a left side of the screen, and can include the virtual camera identifier to be configured (shown as "Virtual Camera A" in the figure) and corresponding configuration options, where the configuration options include but are not limited to a virtual camera position, a target virtual object, a pitch, a yaw, a roll, a FOV, a capturing focal length, a changing duration, a changing curve, a capturing filter, depth of field effect, etc.

In this embodiment, the configuration interface can be suspended and displayed in the virtual scene interface, or can be slid out from any side edge and displayed in the virtual scene interface. The transparency of the configuration interface can be adjusted based on the actual situation. For example, the transparency of the configuration interface can be ranged from 20% to 80%. It should be noted that, the transparency of each display interface involved in the embodiments of the present disclosure can be adjusted. FIG. 9 shows a schematic diagram of configuration options for just one virtual camera in the configuration interface. In an example, the configuration interface may also include configuration options for multiple virtual cameras. In this case, the area occupied by the configuration interface increases. The configuration interface may be centrally suspended and displayed in the virtual scene interface, which is not limited to this embodiment.

At step 702, the capturing parameters of at least one virtual camera and the identifier of the target virtual object are acquired based on the configuration interface.

In this embodiment, the user can adjust the capturing parameters of the virtual camera based on the configuration interface, and can also select the target virtual object to be captured by the virtual camera based on the configuration interface. When the user triggers the configuration interface, the terminal obtains the capturing parameters of the virtual camera and the identifier of the target virtual object. When multiple virtual cameras are displayed on the configuration interface, the terminal can acquire the capturing parameters corresponding to each of the virtual cameras and the target virtual object corresponding to each of the virtual cameras. In an example, the multiple virtual cameras may correspond to the same target virtual object or different target virtual objects respectively.

At step 703, a camera capturing instruction is generated according to the capturing parameters of the at least one virtual camera and the identifier of the target virtual object.

In this embodiment, after acquiring the capturing parameters of each virtual camera and the target virtual object to be captured, the terminal generates a camera capturing instruction including the identifier of the virtual camera, the capturing parameters of the virtual camera, and the identifier of the target virtual object. The camera capturing instruction is configured to control the virtual camera corresponding to the identifier of the virtual camera to perform a capturing operation on the target virtual object based on the capturing parameters of the virtual camera, to generate the capturing data of the target virtual object, which is not limited to this embodiment.

In this embodiment, the terminal can obtain the identifier of the virtual camera, the capturing parameters of the virtual camera, and the corresponding target virtual object to generate the camera capturing instruction, so as to realize the capturing of the target virtual object and simplify the production complexity of the video of the target virtual object.

There are various ways for the terminal to acquire the capturing parameters of the virtual camera. In an optional embodiment of the present disclosure, the virtual scene interface includes multiple camera controls, such as a camera control shown in either of the upper left corner and the upper right corner of the virtual scene as shown in FIG. 11. Each camera control is in the form of a camera and is associated with a respective virtual camera correspondingly.

The camera control can accept various triggering operations from the user. In response to the camera control being triggered, the configuration interface is displayed in the virtual scene interface. As shown in FIG. 10, in the above step 702, the acquiring the capturing parameters of the at least one virtual camera based on the configuration interface, includes steps S801 to S802.

At step 801, in response to a third triggering operation on the at least one camera control, the configuration options of each virtual camera corresponding to a respective camera control in the configuration interface are displayed.

In this embodiment, the third triggering operation for the camera control may be an operation of the user on the camera control, such as clicking, double-clicking, dragging, the sliding, etc. The configuration options of the virtual camera selected by the user can be displayed in the configuration interface, in response to the user's third triggering operation. In an example, the user can trigger the operation by dragging the camera control to a designated area in the virtual scene interface. In response to detecting the triggering operation, the terminal displays the configuration options of the virtual camera corresponding to the camera control dragged to the designated area, in the configuration interface.

At step 802, the capturing parameters of each virtual camera corresponding to a respective camera control are acquired based on the configuration options of the virtual camera corresponding to the respective camera control.

In this embodiment, the configuration interface displays the configuration options of the virtual camera corresponding to the respective camera control selected by the user, and the terminal can acquire the capturing parameters of the virtual camera corresponding to the respective camera control configured by the user based on the configuration interface. In an example, the configuration interface may refer to that shown in FIG. 9. The capturing parameters shown in FIG. 9 are only for reference. The capturing parameters of the actual virtual camera may include but are not limited to the virtual camera position, the target virtual object, the pitch, the yaw, the roll, the FOV, the capturing focal length, the changing duration, the changing curve, the capturing filter, the depth of field effect, etc. The settings of the actual configuration interface can also be determined according to the actual situation, which are not limited to this embodiment.

In an example, the camera control can also be placed at any position in the virtual scene interface. Referring to FIG. 11, the upper left corner and the upper right corner of the interface each display a camera-like camera control. The user can directly operate and trigger the camera control to achieve the purpose of displaying the configuration interface on the virtual scene interface. For example, in response to the user's operation on the camera control A, the terminal displays the options of the capturing parameters of the virtual camera corresponding to the camera control A in the configuration interface, which is not limited to this embodiment.

In this embodiment, the user can configure the capturing parameters of the corresponding virtual camera based on the camera control in the virtual scene. The user can configure the capturing parameters of one or more virtual cameras at the same time, which improves the configuration efficiency of the capturing parameters of the virtual cameras, and simplifies the configuration process of the capturing parameters for virtual cameras.

There are various ways for the terminal to acquire the capturing parameters of the virtual camera. In an optional embodiment of the present disclosure, the virtual scene interface includes multiple camera controls. As described above, after the camera control(s) is triggered, the configuration interface can be displayed in the virtual scene interface. In the above step 702, the acquiring the capturing parameters of the at least one virtual camera based on the configuration interface, includes a following step.

In response to a fourth triggering operation on the at least one camera control, the capturing parameters of each camera control are acquired according to the corresponding relationship between the camera control and the capturing parameters.

In this embodiment, the terminal can pre-configure the capturing parameters of each virtual camera corresponding to a respective camera control, display each camera control on the virtual scene interface. The user can determine the virtual camera that matches the current capturing situation based on the positions of the multiple camera controls. In response to the user's fourth triggering operation based on the camera control, the terminal can acquire the capturing parameters of the virtual camera corresponding to the current camera control. In an example, the fourth triggering operation may be an operation of the user on the camera control, such as clicking, double-clicking, dragging, sliding, etc., which is not limited to this embodiment.

In this embodiment, the terminal can directly create the corresponding relationship between each of camera controls and the capturing parameters, and the user may just need to select the camera control suitable for the current capturing scene, and does not need to configure complex parameters, thereby simplifying the process of configuring the parameters of the virtual camera.

The configuration interface may further include multiple object controls. In an optional embodiment of the present disclosure, acquiring the identifier of the target virtual object based on the configuration interface, includes a following step.

In response to a fifth triggering operation on at least one object control, the identifier of the target virtual object corresponding to a respective one of the at least one object control is acquired.

In this embodiment, the configuration interface includes multiple object controls (not shown in the figures). Each object control corresponds to a virtual object. When the user determines the virtual object to be captured by the virtual camera, the user can determine the target virtual object corresponding to the virtual camera through the configuration interface. In response to detecting the fifth triggering operation triggered by the user based on the object control, the terminal acquires the identifier of the target virtual object corresponding to the selected object control and serves as the target virtual object to be captured by the virtual camera. In an example, the fifth triggering operation may be an operation of the user on the object control, such as clicking, double-clicking, dragging, sliding, etc., which is not limited to this embodiment.

In this embodiment, the terminal can acquire the identifier of the target virtual object corresponding to the object control selected by the user based on the object control, thereby forming the corresponding relationship between the virtual camera and the target virtual object, realizing tracking and capturing of the target virtual object by the virtual camera, and completing the production of the video of the target virtual object by the virtual camera.

Figure 12:
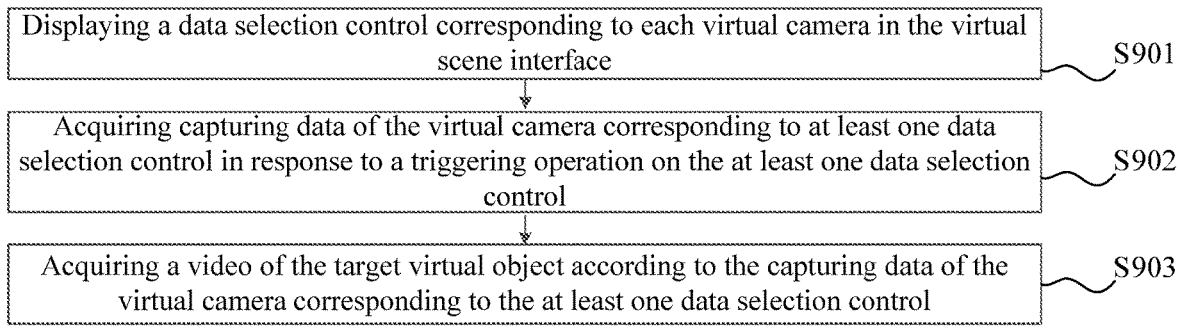
FIG. 12 is a schematic flowchart of a video acquisition method according to another embodiment.

After acquiring the capturing data of the virtual camera, the terminal may perform data post-processing on the capturing data to obtain the video of the target virtual object. In an optional embodiment of the present disclosure, as shown in FIG. 12, acquiring the video of the target virtual object based on the capturing data, includes step 901 to step 903.

At step 901, a data selection control corresponding to each virtual camera is displayed in the virtual scene interface.

In this embodiment, the data selection control (not shown in the figures) can be understood as a selection control for capturing data. Based on the data selection control, the user can select capturing data for generating a video. Exemplarily, the capturing data stored by each of the virtual cameras can be suspended and displayed in the virtual scene interface. Further, options of the capturing time period, options of the capturing object, and options of the capturing virtual scenes can also be displayed in the virtual scene interface, and are used to screen the capturing data. In the virtual scene interface, the user can screen the capturing data based on the options of the capturing time period, the options of the capturing object, and the options of the capturing virtual scene, so that the data selection control corresponding to the screened capturing data is displayed in the virtual scene interface. For example, the data selection control of the virtual camera A is displayed in the virtual scene interface. The user can select the options where the capturing time period is from 16:00 to 20:00 on April 20, the capturing object is the virtual object 1, and the capturing virtual scene is the virtual living room scene, so that at least one capturing data of virtual camera A is displayed in the data selection control of the virtual camera A.

At step 902, in response to a triggering operation on the at least one data selection control, the capturing data of the virtual camera corresponding to the at least one data selection control is acquired.

In this embodiment, the user can perform a selection operation based on at least one capturing data displayed in the data selection control. In response to the triggering operation for the selection, the terminal determines one or more capturing data selected by the user, based on the data selection control triggered by the user through operations such as clicking, double-clicking, sliding, etc.

At step 903, a video of the target virtual object is acquired according to the capturing data of the virtual camera corresponding to the at least one data selection control.

In this embodiment, after the terminal determines the corresponding one or more capturing data based on the one or more data selection controls triggered by the user, the terminal performs video production based on the one or more capturing data. Exemplarily, the terminal can perform processing such as stitching, merging, editing, etc. on multiple capturing data, thereby generating a video according to the multiple capturing data. The video can be stored in a memory of the terminal in the format of lua file, or uploaded to a server.

Figure 13:
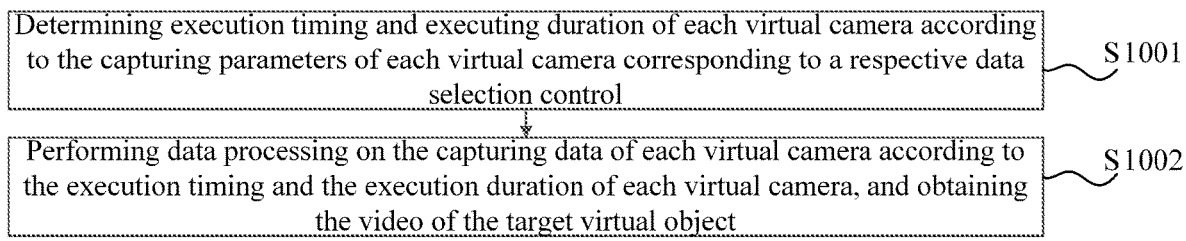
FIG. 13 is a schematic flowchart of a video acquisition method according to another embodiment.

In an example, as shown in FIG. 13, the acquiring the video of the target virtual object according to the capturing data of the virtual camera corresponding to the at least one data selection control, includes steps S1001 to S1002.

At step 1001, execution timing and executing duration of each virtual camera are determined according to the capturing parameters of each virtual camera corresponding to a respective data selection control.

In this embodiment, the terminal may acquire the capturing parameters of the virtual camera corresponding to the data selection control. The capturing parameters of the virtual camera may include parameters such as capturing starting timing, capturing ending timing, capturing duration, etc. That is, the capturing parameters include information such as the capturing duration and capturing time point of the capturing data generated by each virtual camera.

At step 1002, data processing is performed on the capturing data of each virtual camera according to the execution timing and the execution duration of each virtual camera, and the video of the target virtual object is obtained.

In this embodiment, the execution timing and the execution duration of each virtual camera can be configured in the configuration interface of the virtual camera. Exemplarily, the user can configure the execution timing of the virtual camera, the execution duration of the virtual camera, and jumping to the virtual camera in the configuration interface of the virtual camera. Exemplarily, the user can set the execution timing of the virtual camera A to 13:00, and then the virtual camera A captures the target virtual object 1 with a preset rotation angle, a preset FOV, and a preset focal length for an execution duration of 60s, and switches to the virtual camera B at 61s; the execution timing of the virtual camera B is set to 13:01, and then the virtual camera B captures the target virtual object 1 with a preset rotation angle, a preset FOV, and a preset focal length for an execution duration of 180s, and enters a dormant state at 181s, and then moves to the target position at 200s and enters the normal working state, and so on.

The terminal can acquire the execution timing and the execution duration of the virtual camera corresponding to the data selection control, and determine the order of the capturing data corresponding to each time frame on the time frames, based on the execution timing and the execution duration, that is, determine the capturing order of each capturing data. The terminal performs stitching processing on all the capturing data according to the capturing order, to obtain the video of the target virtual object 1, that is, to obtain the video of the target virtual object. But, the disclosure is not limited to this embodiment.

In this embodiment, after acquiring multiple capturing data of the target virtual object, the terminal can perform post-processing such as stitching, editing, etc. on the multiple capturing data, to realize fast and effective video production.

It should be understood that, although the steps in the flowcharts involved in the above embodiments are sequentially shown by the indications of the arrows, these steps are not necessarily executed in the order indicated by the arrows. Unless explicitly stated herein, the execution of these steps is not strictly limited to the order, and the steps may be executed in other orders. Moreover, at least a part of the steps in the flowcharts involved in the above embodiments may include multiple steps or multiple stages, and these steps or stages are not necessarily executed and completed at the same time, but may be performed at different times. The execution order of these steps or stages is not necessarily sequential, but may be performed alternately or in turn with other steps or at least a part of the steps or stages of the other steps.

Based on the same inventive concept, some embodiments of the present disclosure further provide a video acquisition device for implementing the above-mentioned video acquisition method. The implementation solution for solving the problem provided by this device is similar to the implementation solution described in the above methods, so the specific limitations in the embodiments of one or more video acquisition devices provided below can refer to the above limitations on the video acquisition method, which are not repeated herein.

Figure 14:
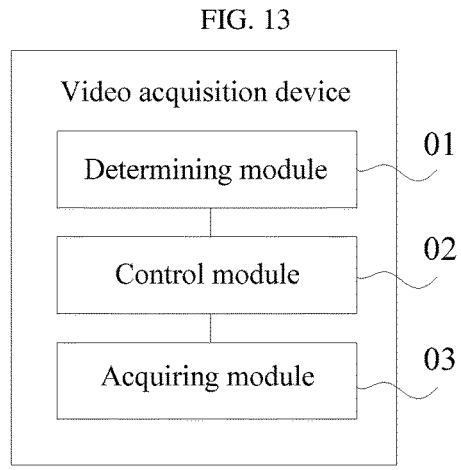
FIG. 14 is a block diagram showing a structure of a video acquisition device according to an embodiment.

In an embodiment, as shown in FIG. 14, a video acquisition device is provided, which is applicable to a virtual scene, where the virtual scene includes a virtual object(s) and a virtual camera(s). The video acquisition device includes a determining module 01, a control module 02 and an acquiring module 03.

The determining module 01 is configured to determine a target virtual object from the virtual object(s) in response to a camera capturing instruction triggered by a user on a virtual scene interface.

The control module 02 is configured to control the virtual camera to capture the target virtual object, to acquire capturing data of the target virtual object.

The acquiring module 03 is configured to acquire a video of the target virtual object based on the capturing data.

In an optional embodiment of the present disclosure, the determining module 01 is configured to determine the target virtual object corresponding to each virtual camera from the virtual object(s) in response to the camera capturing instruction. The control module 02 is configured to control each virtual camera to capture a plot progress of the corresponding target virtual object in the virtual scene, based on the target virtual object corresponding to each virtual camera, to obtain the capturing data of each target virtual object.

In an optional embodiment of the present disclosure, when multiple virtual cameras correspond to the same target virtual object, and the capturing parameters of the multiple virtual cameras are different, the control module 02 is configured to control the multiple virtual cameras to capture the plot progresses of the target virtual object in the virtual scene respectively, based on the respective capturing parameters, to obtain the capturing data of the target virtual object.

Figure 15:
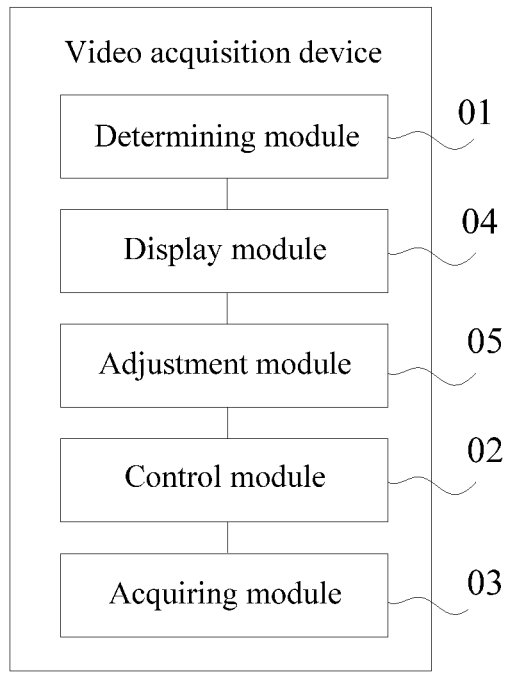
FIG. 15 is a block diagram showing a structure of a video acquisition device according to another embodiment.

In an optional embodiment of the present disclosure, as shown in FIG. 15, the above-mentioned video acquisition device further includes a display module 04 and an adjustment module 05.

The display module 04 is configured to display the virtual camera in the virtual scene interface.

The adjustment module 05 is configured to adjust the capturing parameters of the virtual camera in the virtual scene interface in response to a first triggering operation for the virtual camera.

In an optional embodiment of the present disclosure, the display module 04 is further configured to display the capturing progress of the virtual camera on the virtual scene interface during the capturing process of the virtual camera.

Figure 16:
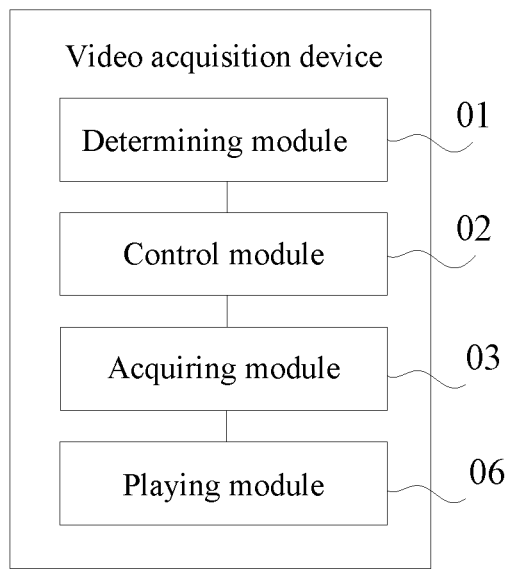
FIG. 16 is a block diagram showing a structure of a video acquisition device according to another embodiment.

In an optional embodiment of the present disclosure, as shown in FIG. 16, the above-mentioned video acquisition device further includes a play module 06.

The playing module 06 is configured to play the video in the virtual scene interface in response to a playing instruction for the video.

In an optional embodiment of the present disclosure, the playing module 06 is configured to hide all virtual objects in the virtual scene interface and switch to a video playing interface in response to the playing instruction of the video, to play the video in the video playing interface.

In an optional embodiment of the present disclosure, the playing module 06 is further configured to acquire the current plot of the virtual scene interface, and play the video on the virtual scene interface when the current plot is a key plot node.

In an optional embodiment of the present disclosure, the display module 04 is further configured to display a configuration interface in the virtual scene interface in response to a second triggering operation on the configuration control in the virtual scene interface. The determining module 01 is further configured to acquire the capturing parameters of the at least one virtual camera and an identifier of the target virtual object based on the configuration interface. The determining module 01 is further configured to generate a camera capturing instruction according to the capturing parameters of the at least one virtual camera and the identifier of the target virtual object.

In an optional embodiment of the present disclosure, the configuration interface includes multiple camera controls. After the camera control(s) is triggered, the configuration interface is displayed in the virtual scene interface. The display module 04 is further configured to display configuration options of each camera control in the configuration interface in response to a third triggering operation on the at least one camera control. The determining module 01 is further configured to acquire the capturing parameters of the virtual camera corresponding to each camera control based on the configuration options of each camera control.

In an optional embodiment of the present disclosure, the configuration interface includes multiple camera controls. After the camera control(s) is triggered, the configuration interface is displayed in the virtual scene interface. The determining module 01 is further configured to acquire the capturing parameters of each camera control according to the corresponding relationship between the camera controls and the capturing parameters respectively, in response to a fourth triggering operations on the at least one camera control.

In an optional embodiment of the present disclosure, the configuration interface includes multiple object controls. The determining module 01 is further configured to obtain the identifier of the target virtual object corresponding to a respective object control in response to a fifth triggering operation on the at least one object control.

In an optional embodiment of the present disclosure, the acquiring module 03 is configured to display a data selection control(s) corresponding to the virtual camera(s) in the virtual scene interface, acquire capturing data of the virtual camera corresponding to at least one data selection control in response to a triggering operation on the at least one data selection control, and acquire the video of the target virtual object according to the capturing data of the virtual camera corresponding to the at least one data selection control.

In an optional embodiment of the present disclosure, the acquiring module 03 is configured to determine execution timing and executing duration of each virtual camera according to the capturing parameters of the virtual camera corresponding to each data selection control, and perform data processing on the capturing data of each virtual camera according to the execution timing and the execution duration of each virtual camera, to obtain the video of the target virtual object.

For the implementation principle and beneficial effects of the above video acquisition device, reference may be made to the description in the foregoing embodiments of the video acquisition method, which will not be repeated herein.

The division of the modules in the above video acquisition device is only for illustration. In other embodiments, the video acquisition device may be divided into various modules as required to complete all or part of the functions of the above video acquisition device.

For the specific definition of the video acquisition device, reference may be made to the definition of the video acquisition method above, which will not be repeated herein. The modules in the above video acquisition device may be implemented in whole or in part by software, hardware, and combinations thereof. The above modules can be embedded in or independent of the processor in the computer device in the form of hardware, or stored in a memory in the computer device in the form of software, so that the processor can call and execute the operations corresponding to the above modules.

Some embodiments of the present disclosure further provide an electronic device. The electronic device includes one or more memories, and one or more processors. One or more programs are stored in the one or more memories, and when the one or more programs are executed by the one or more processors, the electronic device is caused to execute the steps of the video acquisition method described in any of the foregoing embodiments.

Figure 17:
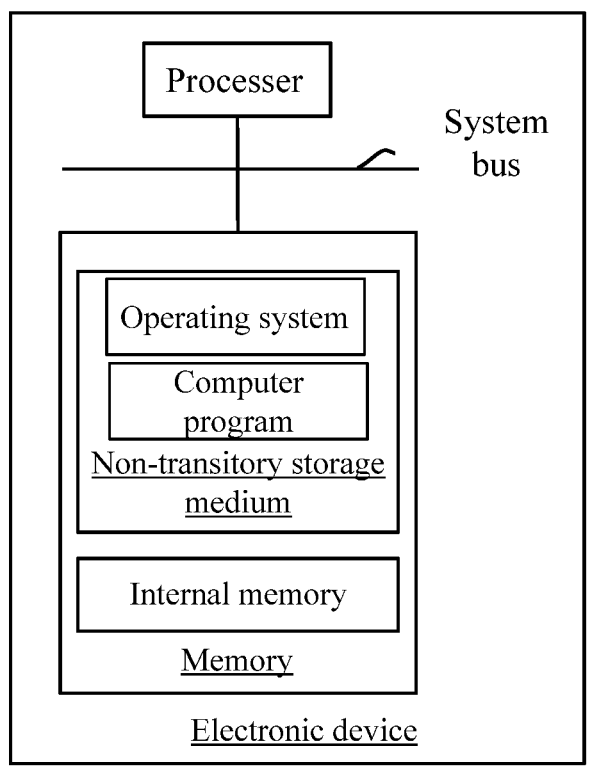
FIG. 17 is a schematic diagram showing an internal structure of an electronic device according to an embodiment.

FIG. 17 is a schematic diagram showing an internal structure of an electronic device in an embodiment. The electronic device may be any terminal device such as a mobile phone, a tablet computer, a notebook computer, a desktop computer, a personal digital assistant (PDA), a point of sales (POS), a vehicle-mounted computer, a wearable device, and the like. The electronic device includes a processor and a memory that are connected via a system bus. The processor may include one or more processing units. The processor may be a central processing unit (CPU) or a digital signal processing (DSP) or the like. The memory may include a non-transitory storage medium and an internal memory. The non-transitory storage medium stores an operating system and a computer program. The computer program can be executed by the processor to implement the video acquisition method provided by the above embodiments. The internal memory provides a cached environment for running the operating system and the computer programs in the non-transitory storage medium.

Embodiments of the present disclosure further provide a computer-readable storage medium. One or more non-transitory computer-readable storage media includes a computer program, when the computer program is executed by one or more processors, the one or more processors perform the steps of the video acquisition method provided by the above embodiments.

Embodiments of the present disclosure further provide a computer program product including instructions. When the computer program product is run on a computer, the computer executes the steps of the video acquisition method provided by the above embodiments.

Any reference to a memory, storage, database, or other medium as used herein may include a non-transitory and/or transitory memory. The non-transitory memory can include a read-only memory (ROM), a programmable read-only memory (PROM), an erasable programmable read-only memory (EPROM), an electrically erasable programmable read-only memory (EEPROM), or a flash memory. The transitory memory may include a random access memory (RAM), which is used as an external cache memory. By way of illustration and not limitation, RAM is available in various forms, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a sync link dynamic random access memory (SLDRAM), a rambus dynamic random access memory (RDRAM), a direct rambus dynamic random access memory (DRDRAM).

The above-mentioned embodiments only illustrate several embodiments of the present disclosure, and the descriptions thereof are relatively specific and detailed, but should not be construed as a limitation on the scope of the patent of the present disclosure. It should be noted that for those skilled in the art, without departing from the concept of the present disclosure, several modifications and improvements can be made, which all fall within the protection scope of the present disclosure. Therefore, the scope of protection of the present disclosure shall be subject to the appended claims.

What is claimed is:

1. A video acquisition method, applied at a virtual scene comprising at least one virtual object and at least one virtual camera, the method comprising:
   determining a target virtual object corresponding to each of the at least one virtual camera from the at least one virtual object in response to a camera capturing instruction triggered by a user on a virtual scene interface;
   controlling each of the at least one virtual camera to capture a plot progress of the target virtual object in the virtual scene, based on the target virtual object corresponding to each of the at least one virtual camera, to obtain the capturing data of the respective target virtual object;
   acquiring a video of the target virtual object based on the capturing data;
   hiding all the at least one virtual object in the virtual scene interface and switching the virtual scene interface to a video playing interface in response to a playing instruction for the video; and
   playing the video in the video playing interface.

2. The method according to claim 1, wherein the at least one virtual camera comprises a plurality of virtual cameras, and the controlling each of the plurality of virtual cameras to capture the plot progress of the respective target virtual object in the virtual scene, based on the target virtual object corresponding to each of the plurality of virtual cameras, to obtain the capturing data of the respective target virtual objects comprises:
   when the plurality of virtual cameras correspond to a same target virtual object and capturing parameters of the plurality of virtual cameras are different, controlling each of the plurality of virtual cameras to capture the plot progress of the target virtual object in the virtual scene based on a respective capturing parameter, to obtain the capturing data of the target virtual object.

3. The method according to claim 1, further comprising:
   displaying the at least one virtual camera in the virtual scene interface; and
   adjusting a capturing parameter of a respective virtual camera in the virtual scene interface in response to a first triggering operation on the respective virtual camera.

4. The method according to claim 1, further comprising:
   displaying a capturing progress of a respective virtual camera in the virtual scene interface during a capturing process of the respective virtual camera.

5. The method according to claim 1, further comprising:
   acquiring a current plot of the virtual scene interface; and
   playing the video in the virtual scene interface in response to the current plot being a key plot node.

6. The method according to claim 1, wherein the camera capturing instruction triggered by the user on the virtual scene interface is configured in a manner comprising:
   displaying a configuration interface in the virtual scene interface in response to a second triggering operation on a configuration control in the virtual scene interface;
   acquiring a capturing parameter of the at least one virtual camera and an identifier of the target virtual object, based on the configuration interface; and
   generating the camera capturing instruction according to the capturing parameter of the at least one virtual camera and the identifier of the target virtual object.

7. The method according to claim 6, wherein the virtual scene interface comprises a plurality of camera controls; and the configuration interface is configured to be displayed in the virtual scene interface in response to a respective camera control being triggered; the acquiring the capturing parameter of the at least one virtual camera based on the configuration interface comprises:
- displaying a configuration option of a respective virtual camera corresponding to the respective camera control in the configuration interface in response to a third triggering operation on the respective camera control; and
- acquiring the capturing parameter of the respective virtual camera corresponding to the respective camera control based on the configuration option of the respective virtual camera corresponding to the respective camera control.

8. The method according to claim 6, wherein the virtual scene interface comprises a plurality of camera controls; and the configuration interface is configured to be displayed in the virtual scene interface in response to a respective camera control being triggered; the acquiring the capturing parameter of the at least one virtual camera based on the configuration interface comprises:
- acquiring the capturing parameter of each camera control according to a relationship between the plurality of camera controls and the capturing parameters in response to a fourth triggering operations on the respective camera control.

9. The method according to claim 6, wherein the configuration interface comprises a plurality of object controls; and the acquiring the identifier of the target virtual object based on the configuration interface comprises:
- acquiring the identifier of the target virtual object corresponding to a respective object control in response to a fifth triggering operation on the respective object control.

10. The method according to claim 1, wherein the acquiring the video of the target virtual object based on the capturing data comprises:
- displaying a data selection control corresponding to a respective virtual camera in the virtual scene interface;
- acquiring capturing data of the respective virtual camera corresponding to a respective data selection control in response to a triggering operation on the respective data selection control; and
- acquiring the video of the target virtual object according to the capturing data of the respective virtual camera corresponding to the respective data selection control.

11. The method according to claim 10, wherein the acquiring the video of the target virtual object according to the capturing data of the respective virtual camera corresponding to the respective data selection control comprises:
- determining execution timing and executing duration of the respective virtual camera according to the capturing parameter of the respective virtual camera corresponding to the respective data selection control; and
- performing data processing on the capturing data of the respective virtual camera according to the execution timing and the execution duration of the respective virtual camera, to obtain the video of the target virtual object.

12. An electronic device, comprising:
one or more memories; and
one or more processors;
wherein one or more computer programs are stored in the one or more memories, and when the one or more computer programs are executed by the one or more processors, the electronic device is configured to execute a video acquisition method being applied at a virtual scene, wherein the virtual scene comprises at least one virtual object and at least one virtual camera, and the method comprises:
- determining a target virtual object corresponding to each of the at least one virtual camera from the at least one virtual object in response to a camera capturing instruction triggered by a user on a virtual scene interface;
- controlling each of the at least one virtual camera to capture a plot progress of the target virtual object in the virtual scene, based on the target virtual object corresponding to each of the at least one virtual camera, to obtain the capturing data of the respective target virtual object;
- acquiring a video of the target virtual object based on the capturing data;
- hiding all the at least one virtual object in the virtual scene interface and switching the virtual scene interface to a video playing interface in response to a playing instruction for the video; and
- playing the video in the video playing interface.

13. A non-transitory computer-readable storage medium, storing a computer program, wherein the computer program is executed by a processor, to execute a video acquisition method being applied at a virtual scene, wherein the virtual scene comprises at least one virtual object and at least one virtual camera, and the method comprises:
- determining a target virtual object corresponding to each of the at least one virtual camera from the at least one virtual object in response to a camera capturing instruction triggered by a user on a virtual scene interface;
- controlling each of the at least one virtual camera to capture a plot progress of the target virtual object in the virtual scene, based on the target virtual object corresponding to each of the at least one virtual camera, to obtain the capturing data of the respective target virtual object;
- acquiring a video of the target virtual object based on the capturing data;
- hiding all the at least one virtual object in the virtual scene interface and switching the virtual scene interface to a video playing interface in response to a playing instruction for the video; and
- playing the video in the video playing interface.

14. The method according to claim 1, the acquiring the video of the target virtual object based on the capturing data comprises:
- in the case of acquiring capturing data from a plurality of virtual cameras, performing stitching processing and editing processing on a plurality of capturing data from the plurality of virtual cameras, to obtain the video of the target virtual object.

15. The method according to claim 1, the controlling the at least one virtual camera to capture the target virtual object, to acquire the capturing data of the target virtual object comprises:
- controlling a respective virtual camera to track the target virtual object based on the target virtual object corresponding to the respective virtual camera by using a target object recognition and tracking method, to perform a capturing operation on the target virtual object.

16. The method according to claim 1, wherein,
- the virtual scene is configured to be displayed by a terminal when an application program runs on the terminal;
- the capturing data comprises screenshots of multiple frames taken on the virtual scene interface, or screenshots of multiple frames for a specific capturing area in the virtual scene; and
- the capturing data are acquired based on picture pixel data from a display function interface of the terminal according to a certain period.

17. The method according to claim 1, wherein the acquiring the video of the target virtual object based on the capturing data comprises:
- in the case of acquiring capturing data from one virtual camera, performing time correction, sound and picture synchronization processing on the capturing data, to obtain the video with synchronized sound and picture of the target virtual object.

\* \* \* \* \*